J. F. O'CONNOR.
FRICTION SHOCK ABSORBING MECHANISM.
APPLICATION FILED SEPT. 23, 1918.

1,307,313.

Patented June 17, 1919.

Inventor
John F. O'Connor
By George J. Haight
Atty

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,307,313.   Specification of Letters Patent.   Patented June 17, 1919.

Application filed September 23, 1918. Serial No. 255,242.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

Heretofore, in the art of railway friction draft gears, it has been customary to employ a series of friction elements and a spring associated with a friction shell and casing together with a retaining bolt for maintaining the spring under an initial compression. The object of maintaining the spring under an initial compression is to always insure proper contact between the various friction elements and take up for all wear that occurs during service. Actual practice has demonstrated that the bolts employed for the purpose above indicated are subject to extremely severe tension shocks during the release actions of the mechanisms. This is occasioned by the fact that the bolt "floats" or is free during the compressive stroke and remains free or floating during the release action until the elements approach their normal position. The elements of the mechanism, as they approach their normal position during the release have acquired a great momentum which must be taken up by the bolt with the result that the bolt is sometimes broken or is stretched beyond its elastic limit.

The object of the present invention is to provide an arrangement embodying all the advantages of friction mechanisms of the above indicated type with the spring under a preliminary compression and wherein the use of a retainer bolt is eliminated.

Figure 1:
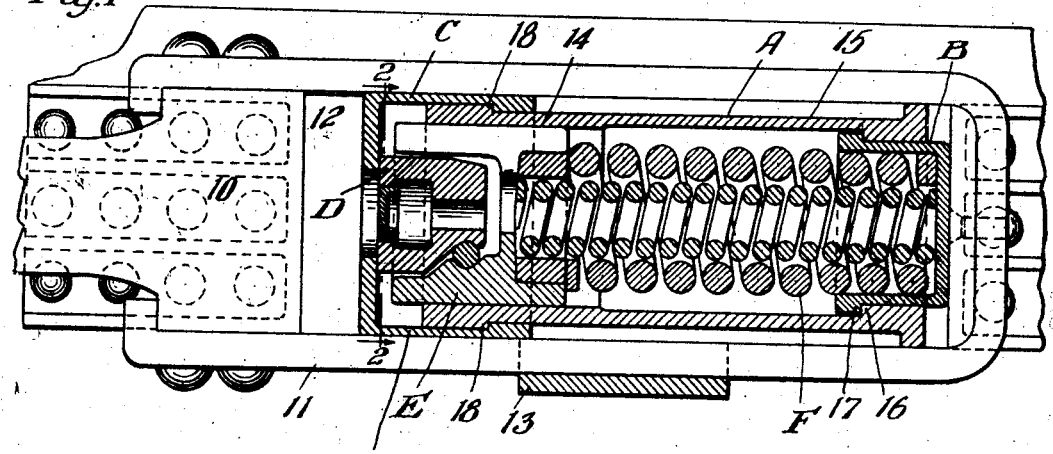
Figure 2:
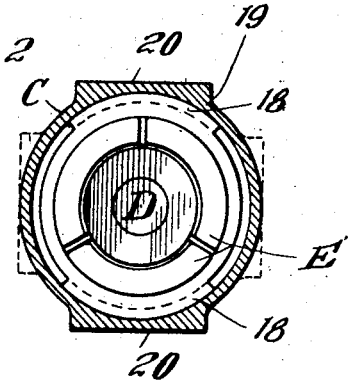
Figure 3:
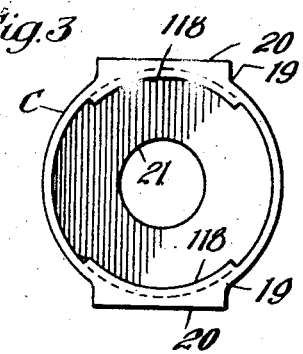
Figure 4:
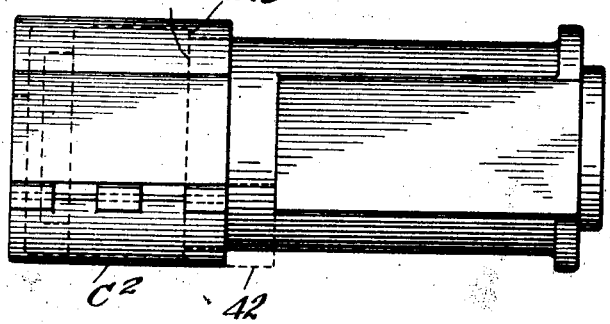
Figure 5:
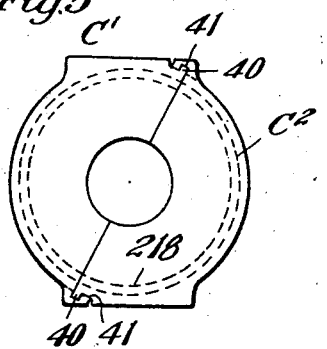

In the drawing forming a part of this specification, Figure 1 is a vertical, longitudinal, sectional view of a portion of a railway draft rigging showing my improvements in connection therewith. Fig. 2 is a vertical, sectional view, taken on the line 2—2 of Fig. 1. Fig. 3 is an end view of the retainer cap, detached. Figs. 4 and 5 are side and end elevations, respectively, of a friction mechanism proper showing another manner of carrying out my invention.

Referring first to the construction illustrated in Figs. 1, 2 and 3, I have shown my improved shock absorbing mechanism as forming part of a railway draft rigging, the latter including a draw bar 10, yoke 11, front follower 12 and supporting saddle 13, it being understood that suitable stops are provided on the draft sills of the car.

The shock absorbing mechanism proper, as shown, comprises a substantially cylindrical casting A, a rear preliminary spring follower B, a front retaining cap C, wedge D, friction shoes E, and main spring F.

The casting A combines a friction shell proper 14 and a spring casing 15, the casting A being open at both ends. At its rear end, it is provided on the interior thereof with an annular shoulder 16 with which coöperates a corresponding annular shoulder 17 formed on the follower B. As will be understood, the follower B is inserted from the front end of the casting A.

The arrangement of friction shoes, wedge and spring is of well known form and need not be specifically described.

The shell 14 of the casting A is formed on its outer side with rearwardly facing, diametrically disposed, quadrant shoulders 18—18. The cap C is of generally cylindrical form with its outer end extending over and engaging the wedge D. The cap C is provided with a rearwardly extending annular flange portion 19 which, at its rear end, is formed on the interior thereof with forwardly facing, diametrically disposed, quadrant shoulders 118—118. The shoulders 18 and 118 are so arranged, as will be evident from an inspection of Figs. 2 and 3, that the cap is placed over the shell when in one position, as for instance, the horizontal position indicated by dotted lines in Fig. 2, and is then turned 90° so as to engage said shoulders. To prevent accidental turning of the cap with respect to the casting A, after the parts are in place in the draft rigging, the cap is formed with upper and lower horizontal portions 20—20, as shown in Figs. 2 and 3, which engage with the upper and lower arms of the yoke strap, as will be understood.

The cap is formed with an opening, as indicated at 21, suitable for the admission of a plunger by which the parts of the gear proper may be placed under compression in a bulldozer while the cap is being applied.

With the arrangement above described, it is evident that the spring F can be placed under any desired compression when the cap is applied and all the advantages of a retaining bolt obtained. Furthermore, the connection between the cap and the casing is extremely strong and well adapted to resist the heavy shocks imposed thereon. In addition, by eliminating the use of a retaining bolt, I am enabled to employ a simple form of preliminary spring follower at the rear end of the friction shell, which could not be done in the former types where the retainer bolt has had to be anchored to the rear wall of the friction shell or spring casing.

In the construction illustrated in Figs. 4 and 5, the cap is formed in two parts $C^1$ and $C^2$. These parts are provided with corresponding tongued and grooved sections, as indicated at 40 and 41 in Fig. 5, the tongued and grooved sections being formed on alternate, spaced flanges of the two cap members $C^1$ and $C^2$, as shown in Fig. 4. As will be understood, the two members of the cap are formed with an inwardly extending annular shoulder 218 coöperable with a continuous annular shoulder 318 on the shell. In other respects the construction follows that shown in Figs. 1, 2 and 3. To assemble the cap shown in Figs. 4 and 5, one member of the cap is applied to the shell in normal position and the other member of the cap is first applied at a more rearward position, as indicated by the dotted lines 42 in Fig. 4, that is, with the spaced flanges of one cap member offset with respect to the flanges of the other cap member, and thereupon the rearmost cap member is slid forwardly to engage the tongued and grooved portions 40 and 41. As will be understood, the cap is applied while the gear is under compression in a bulldozer or the like and when the gear is released and the two-part cap in place, it cannot become accidentally disengaged.

I claim:

1. In a friction shock absorbing mechanism, the combination with a friction shell, friction elements coöperable therewith and extending partly beyond one end of said shell, and spring means adapted to resist relative movement between said elements and shell, of means for limiting the outward movement of said elements with respect to the shell, said means including a cap extending over the outer end of said elements, and coöperable shoulders on the shell and cap, said cap comprising a plurality of parts detachably interlocked with each other and held in operative condition by the friction elements.

2. In a shock absorbing mechanism, the combination with a hollow casting, of cushioning means disposed within said casting and extended partly beyond one end thereof, and a cap coöperable with said casting and means, said cap and casting having coöperable opposed shoulders arranged to limit the separating movement of the cap and casting, said cap comprising a multiple of pieces having detachable shouldered connection with each other, the pieces of said cap being assembled with each other by shifting them relatively, the cap pieces being prevented from relative separation by the cushioning means extended beyond the end of the casting and engaging the cap.

In witness that I claim the foregoing I have hereunto subscribed my name this 9th day of Sept., 1918.

JOHN F. O'CONNOR.